United States Patent Office 3,534,498
Patented Oct. 20, 1970

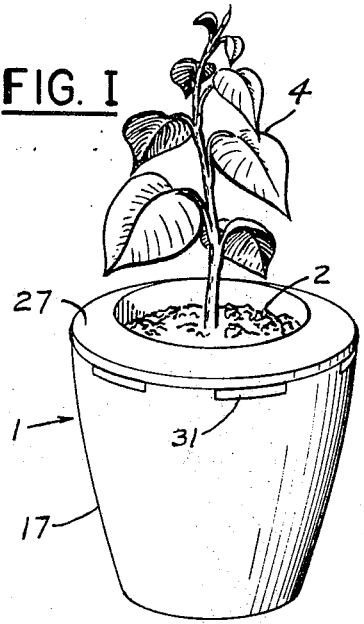
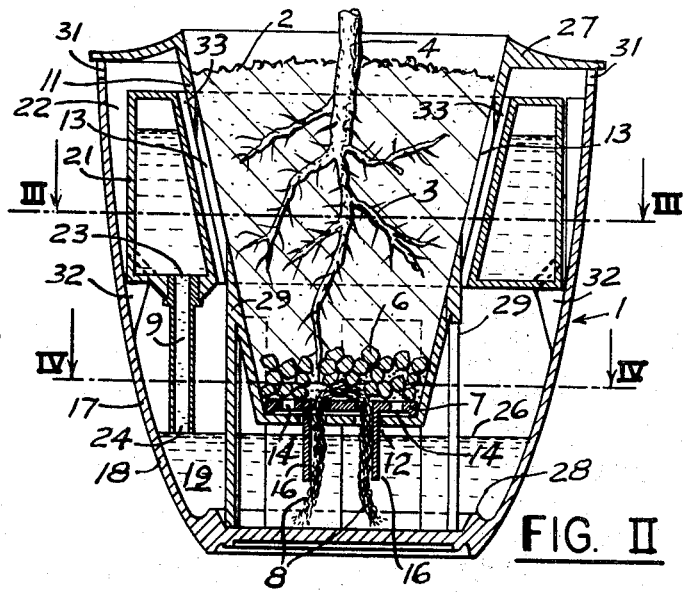
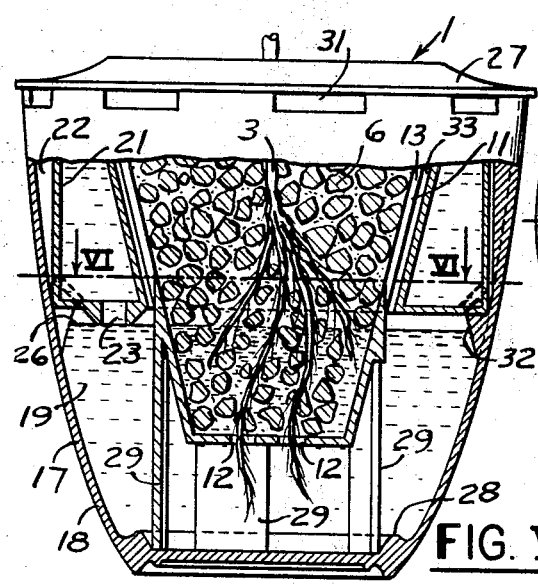
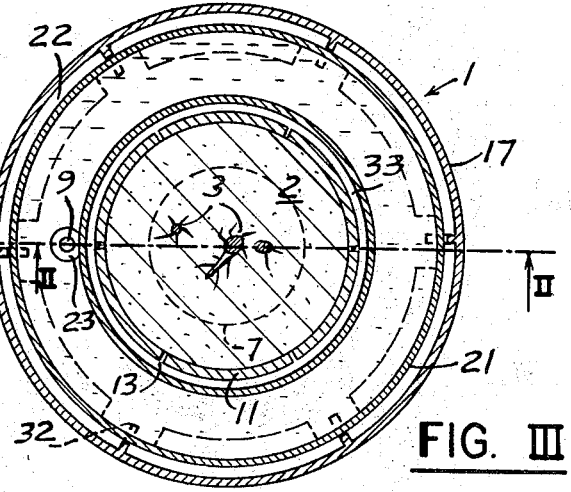
INVENTOR.
PETER HERRLI

3,534,498
INSTALLATION FOR PLANTS
Peter Herrli, 36 Ricky Lane, South Norwalk,
Conn. 06854
Filed Apr. 16, 1968, Ser. No. 721,723
Int. Cl. A01g 27/00
U.S. Cl. 47—38.1     1 Claim

ABSTRACT OF THE DISCLOSURE

This disclosure teaches a novel installation for growing and/or sustaining plants. A pot is embraced by a housing with a removal reservoir positioned therein. The reservoir has a port which fixes a water level in the housing by means of restricting displacement of water by air in the reservoir when the level of water in the housing has reached that port. For hydroponic systems the water level is communicated to the pot via at least one opening in the bottom thereof. For growing plants in soil, the water level is maintained below the pot and a wick transports water via capillary action to the pot. A layer of relatively coarse inert material meters capillary migration of the water into the soil. The pot is also provided with air vents to avoid rotting of plant roots.

BACKGROUND

This invention relates to an installation which is adaptable for growing plants in soils as well as in hydroponic systems. It is desired to be able to sustain plants in such installations even if they must be left unattended for substantial periods of time. This feature is especially important for a plant in one's home or apartment when he is away. A basic problem is to provide water and/or nutrients throughout the period when the plant is unattended. This problem is even more acute in hydroponic systems where plants are grown in nutrient water solutions with or without sand, gravel or some other inert medium to provide mechanical support.

SUMMARY

Applicant solves the foregoing problem in a particularly facile way. A pot is fashioned with a housing having a removal reservoir positionable therein and with an opening formed in the reservoir to fix a water level in the housing. For hydroponic systems the water is communicated into the pot via at least one opening is the bottom thereof. When growing plants in soil the water level is fixed below the pot and a wick transports water via capillary migration to the pot. A layer of relatively inert coarse material meters capillary migration of the water from the wick upward into the soil. The level of water can be adjusted by connecting a tube of a desired length to project downward from the opening.

The basic objective of this invention is to provide a reliable and metered supply of water and/or other nutrients to a plant, particularly during periods when the plant is unattended.

A further objective when applying this installation to growing plants in soils is to prevent the wick from straightening out by virtue of its natural tendency to return to the form which its fibers prefer.

A further objective is to meter the supply of water from the wick to the soil.

A further objective is to provide improved centering of the pot in its housing.

A further objective is to provide a reservoir which can be easily filled and positioned in the housing.

A further objective is to maintain circulation of air to the soil by way of air slits so that rotting of roots is avoided.

A further objective is to provide an installation for growing plants which is attractive in appearance and is otherwise well suited to its intended purpose.

DRAWINGS

The foregoing and other features will appear more fully from the accompanying drawing wherein:

FIG. I is an isometric view illustrating this installation in its assembled relationship with the plant mounted therein.

FIG. II is an elevation view in section showing this installation used for growing a plant in soil.

FIG. III is a section taken along line III—III of FIG. II.

FIG. IV is a section taken along line IV—IV of FIG. II.

FIG. V is a broken elevation view of this installation applied to service in a hydroponic system.

FIG. VI is a section taken along line VI—VI of FIG. V.

PREFERRED EMBODIMENTS

Two preferred embodiments are best seen in FIGS. II and V respectively. In FIG. II the installation of this invention (generally designated 1) is used for growing a plant in soil. FIG. V depicts a slightly modified embodiment used in a hydroponic application. Obviously the differences between the embodiments of FIGS. II and V are the use of soil 2 (or a soil substitute) in FIG. II for supporting roots 3 of plant 4 as compared with use of gravel 6 (or sand or some other relatively coarse medium) in FIG. V to offer mechanical support for the roots. It is also contemplated that some hydroponic applications require no inert medium for mechanical support. Plate 7, wick 8 and tube 9 are used in the soil embodiment of FIG. II but are not generally needed in the hydroponic embodiment of FIG. V.

SOIL EMBODIMENT

Referring to the soil embodiment of FIG. II, pot 11 is provided with holes 12 and air slits 13. Plate 7 is positioned in the bottom of pot 11 to support in turn a layer of gravel 6 and then soil 2 thereover. Plate 7 also defines openings 14. Gravel 6, because of its coarse size and other significant characteristics, limits capillary migration, thereby performing an important metering function which will be described in detail later. Plate 7 has flanges 16 which penetrate holes 12 and retain wick 8 from straightening into its natural shape. As a matter of design choice, flanges 16 could be formed on pot 11, and with a wick inserted in holes 12, plate 7 might be eliminated.

Housing 17 serves as a decorative element of furniture and its lower portion 18 serves as a receptacle for water and other nutrients to supply plant 4. Water 19 migrates by means of capillary forces from lower portion 18 up through wick 8. Pottery soil with a substantial portion of its grain sizes in the fine sand and/or silt size ranges and with usual grain size distributions, have relatively small interstices; therefore, the capillary forces exerted by these soils on water is substantial. If it were not for the layer of gravel 6 in FIG. II, water 19 in lower portion 18 of the housing would quickly be drawn up into soil 2. Gravel 6 has a large grain size and less size spread so its interstices are large, the interfaces of adjacent particles are few and surface tensions developed on water films surrounding particles are less pronounced; accordingly, gravel 6 has a much lower capillarity and serves as a meter, limiting migration of water to soil 2. Naturally if a plant 4 requires much water, the size of gravel can be reduced and/or its grain size distribution can be spread out and/or more angular gravel material can be employed, all with the objective of increasing capillarity to step up flow of water to the plant. If a plant 4 needs less water, the coarseness (size) of the gravel can be increased and/or its size distribution can be narrowed and/or more waterworn particles can be employed all with the objective of reducing capillarity and therefore reducing the supply of water to the plant. On the basis of established plant requirements, analyses of fundamental characteristics of gravel and empirical evidence, guidance is available for scientific gravel selections in installations according to the present invention.

It is desired to provide an ample supply of water for gradual metering to soil 2. Toward this objective housing 17 is provided with removable reservoir 21 which is positionable in upper portion 22 thereof. When pot 11 has been removed from housing 17, one can easily take out reservoir 21, invert it for filling via tube 9 and port 23 and then hold one's finger over the distal end 24 of tube 9 while reservoir 21 is being repositioned in housing 17. When the water level goes below distal end 24 of tube 9, water flows under gravity from reservoir 21 and is displaced in reservoir 21 by air until the level rises to cover distal end 24. When distal end 24 becomes covered, air ceases to enter tube 9 so that water in reservoir 21 is no longer displaced and then atmospheric pressure on water level 26 of housing 17 supports the water in reservoir 21. It should be noted that upper rim 27 of pot 11 could be eliminated and pot 11 could be made cylindrical to allow insertion and removal of reservoir 21 without first requiring removal of pot 11.

It is important that pot 11 be seated with stability in housing 17. Annular flange 28 receives at least three legs 29 to center and support pot 11. These legs offer sufficient resistance to moments so that the risk of accidental overturning is minimized.

Plant roots must have air circulated to them or else they are liable to rot. It is well known that earthenware pots are porous and that they permit access of air therethrough. Unfortunately it is not now practical to make pot 11 of earthenware (plastic is a more likely choice of material); therefore, as shown in FIGS. I and II, air vents 31 are provided to communicate air to air slits 13. Abutments 32 on which reservoir 21 sits and annular flange 28 (which centers and supports legs 29) are arranged to define air space 33 facilitating air circulation.

HYDROPONIC EMBODIMENT

In soil applications as seen in FIG. II, water level 26 is maintained below gravel 6, otherwise the gravel meter would be bypassed. By way of contrast, in hydroponic applications as seen in FIG. V, at least a portion of the roots are immersed in water. It is desired to maintain a high water level in pot 11. For this reason tube 9 is designed to be removeable as is plate 7 and wick 8. Roots 3 can extend through holes 12 into the lower portion of housing 17, however legs 29 help confine these roots therebetween so that they are not damaged on removal of pot 11 for cleaning. It should be self evident from FIGS. V and VI that the installation according to this invention is very suitable for hydroponic systems as well as for soil applications.

It will be further apparent to those familiar with the design of installations for plants that wide deviations may be made from the preferred embodiments without departing from the spirit of the following claim.

What is claimed is:
1. An installation for plants and comprising
    a housing having an annular housing wall and a bottom which define a container having water therein and provided with a central circular raised ridge projecting upward from the bottom,
    a pot made of an impermeable material and having at least three downwardly-projecting legs engaged within the raised ridge for removeably mounting the pot in the housing above the water in the container and spaced from the housing wall to define an air passage,
    the pot having a flat bottom provided with at least four aligned holes comprising two inner holes and two outer holes,
    a wick penetrating the pot via both of the inner holes and having two ends both immersed in the water in the container whereby the water is delivered to the soil in the pot by capillary migration up the wick,
    the pot having a side provided with a plurality of slits for admission of air via the air passage to the soil in the pot,
    a flat plate inserted in the bottom of the pot and having two downward projections which register with the outer holes for penetrating therethrough down into the water in the container and engaging the ends of the wick to overcome the wick's natural tendency toward straightening itself out,
    a layer of relatively course granular material in the pot above the wick and below the soil to meter capillary migration of the water from the wick to the soil,
    the housing wall provided with a plurality of inwardly-projecting abutments,
    an annular reservoir seated on the abutments and surrounding the pot for positioning above the water in the container,
    the reservoir provided with a port to fix the level of water therein on restriction of entry of air therein,
    a tube connected to and having a tube end projecting downward from the port into the water in the container so that when the level of the water in the container goes below the tube end air enters the reservoir via the tube to displace water in the reservoir until the water level in the container again rises above the tube end.

References Cited

UNITED STATES PATENTS

| 1,789,616 | 1/1931 | Bjorklund | 47—34 |
| 1,977,827 | 10/1934 | Kneller | 47—38.1 |
| 2,344,794 | 3/1944 | Vallinos | 47—38.1 |

FOREIGN PATENTS

| 18,374 | 1904 | Great Britain. |
| 1,007,283 | 5/1952 | France. |
| 1,473,290 | 2/1967 | France. |
| 178,981 | 11/1935 | Switzerland. |

ROBERT E. BAGWILL, Primary Examiner